Aug. 25, 1970 P. W. THIEDE ET AL 3,525,858

WEB REGISTER CONTROL APPARATUS RESPONSIVE TO WEB SPEED AND REGISTER ERROR

Filed May 9, 1967 4 Sheets-Sheet 1

Inventors
PAUL W. THIEDE
CHARLES H. ANGELL
By Silverman & Cass
Attys.

Aug. 25, 1970 P. W. THIEDE ET AL 3,525,858

WEB REGISTER CONTROL APPARATUS RESPONSIVE TO WEB SPEED AND REGISTER ERROR

Filed May 9, 1967 4 Sheets-Sheet 2

Inventors
PAUL W. THIEDE
CHARLES H. ANGELL

By Silverman & Cass

Attys.

Inventors
PAUL W. THIEDE
CHARLES H. ANGELL
By Silverman & Cass
Attys.

Inventors
PAUL W. THIEDE
CHARLES H. ANGELL
By Silverman & Cass
Attys.

United States Patent Office 3,525,858
Patented Aug. 25, 1970

3,525,858
WEB REGISTER CONTROL APPARATUS RESPONSIVE TO WEB SPEED AND REGISTER ERROR

Paul W. Thiede and Charles H. Angell, Danville, Ill., assignors to Hurletron Incorporated, Danville, Ill., a corporation of Delaware Filed May 9, 1967, Ser. No. 637,263
Int. Cl. G06g *7/12;* B65h *23/18*
U.S. Cl. 235—151.22 17 Claims

ABSTRACT OF THE DISCLOSURE

Apparatus having means for monitoring the registration of patterns sequentially applied to a continuously moving web subject to speed variation and for applying registration error indicative signals to a computer for regulation of the speed of web register correction provided by a registration compensator. The computer receives, via tachometers, the web speed and the speed of the compensator, multiplies these parameters together, preferably through a non-linear potentiometer, and applies the product to a differential amplifier having as its other input the registration error signals, such that the resultant output from the differential amplifier, which is fed back to the registration compensator, is the mathematic product of web speed and register error.

This invention relates generally to a moving web register control apparatus for printing presses and the like and more particularly is concerned with a novel register control apparatus through which correction is automatically applied as a result of an out-of-register condition of two operations being performed on the web and is related to two different, dynamic web fed factors.

Although the invention is capable of being applied to any machine which transports a moving web and performs consecutive operations upon the web, these operations required to be in registration, it will be particularly described herein applied to a high speed printing press, such as used to produce newspapers or rotogravure. Further, the invention will be described in connection with a form of error correcting apparatus which is disclosed in U.S. Pat. No. 3,120,181 issued Feb. 4, 1964, to the applicant herein and assigned to the assignee hereof. The invention is not limited to this type of registration control and is readily adaptable to practically any type of control device.

It is known to apply corrections in apparatus having feedback loops in the form of a compound correction which takes into consideration the amount of the error, the direction in which the error occurs, and the rate at which the error is occurring. Thus, in a printing press which is required to apply two consecutive pinting impressions in exact register, it is known to apply some form of correction to the press considering these factors. Typically, the first impression, applied at one station, affixes a registration control mark which is detected by an electronic scanner as the printed pattern approaches the next station where an operation is to be performed. At the second station, the next operation occurs at the same time that a reference signal is produced. The scanner signals and reference signals are compared in some form of comparison device. If they occur simultaneously, the device produces a null signal, since the apparatus had previously been adjusted so that simultaneous occurrence of the signals represents exact registration.

If, on the other hand, the two impressions are out of register, the scanner signal occurs before or after the reference signal and generates an error signal of a certain value and polarity. This error signal may be amplified and used to drive some form of web or press compensator means to force subsequent impressions into register. The polarity of the error signal indicates whether the scanner signal is early or late; the amplitude of the error signal is proportional to the amount of errors and determines the amount of correction to be applied. Additional means may be utilized to apply the correction at a rate representing the rate of change of the error signal. There are many systems of this general type, including those disclosed in U.S. Pats. 2,840,371; 2,840,372; and 3,031,118. In some the errors are accumulated and averaged, in others they are used to apply small pulsed corrections, and so on.

The web printed upon during the period of time that a press has an out-of-register condition is for the most part waste; accordingly, it is highly desirable to apply the correction in a mode which will produce the minimum of waste.

Studies of printing presses have indicated that for any given speed of press there is an optimum rate at which a correction may be made and that this optimum rate, which is related to web stress, declines generally directly with press speed. Thus, if the maximum rate of correction were set not to exceed web stress limits at slow press speeds, then the rate of correction would be inadequate at fast press speeds; hence, considerable web waste. Conversely, if the maximum correction rate were optimized at fast press speeds, then web rupture, etc., at slow web speeds would be a significant factor. Other factors which influence the rate at which correction may be applied are believed to include the reaction of the compensator mechanism and the manner of compensation, that is, whether the feedback is through the web or through the cylinder drive; the stability of the press and compensator mechanism for given correction rates; and perhaps other factors. It is certainly a function of press condition and construction.

The invention contemplates apparatus in the form of a register control in which the rate of application of a correction for out-of-register is proportional to the speed of the press, as well as register error, so that at high speeds the correction is applied at a rate which is the most that the press can absorb without danger of breaking the web or taxing the compensating mechanism; and at low speeds this rate is reduced to apply the correction at the greatest rate which is feasible with a minimum of hunting, overshoot and accompanying problems. In this regard, the principal object of the invention is to provide apparatus which applies a correction in proportion to the press speed for a minimum of register runout.

Another object of the invention is to provide apparatus in which means are provided to measure the press speed at all times and introduce the speed factor into the computer where the factor is effectively multiplied by the error voltage to provide a signal for proportionally driving the web compensating means.

It will be appreciated that the signals which occur in the apparatus are repetitious pulses, so that a series of pulses are being considered by the computer. These may be averaged to provide the necessary driving signals to the compensating means, or may be applied to the compensating means in the form of pulses. The invention is not limited to any form of such output signal. In the preferred structure to be described, a direct current motor is coupled to the computer and forms the compensator actuator which drives a web loop register control compensator.

Instead of providing an output from the computer having one parameter representing the product of the error and press speed, the output signal to the compensator-actuator may be a signal whose amplitude is proportional to the press speed and whose duration is proportional to the amount of registration error. An object of the invention is to provide such apparatus also.

Provision may be made for varying the input to the compensator-actuator in proportion to the rate of change of the error signal, if desired.

Many other objects of the invention will occur to those skilled in this art as a description of the invention proceeds hereinafter in connection with preferred embodiments. The drawings for the most part are diagrammatic in nature since these components are known and understood by those skilled in this art and need not be specified in detail.

As stated above the invention broadly comprises the introduction into a register control system of a compensation multiplier which varies the resultant correction for an out-of-register condition in proportion to the speed at which the machine under control is operating. This multiplier or correction factor is derived by measuring the speed of the machine in some manner. The servo nature of the control system must be considered so that the correction factor changes with press speed and error in a continuous and relatively smooth manner.

Figure 1:
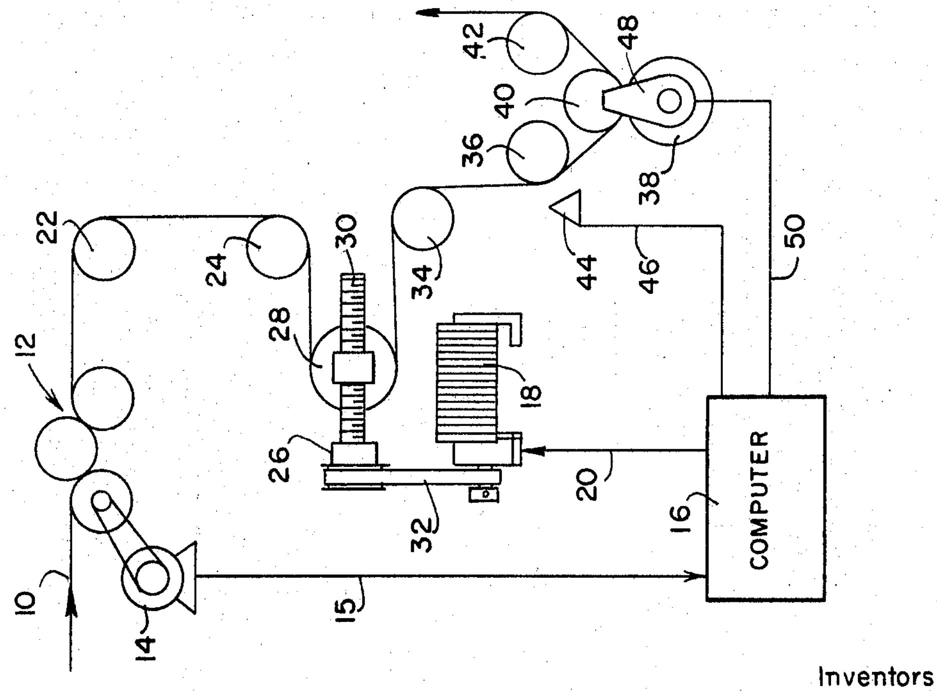
FIG. 1 is a diagrammatic view of a typical color registration control apparatus using the invention in which a feedback loop is taken through the web by means of a compensating loop.

In FIG. 1 there is illustrated a typical color register control system applied to a printing press, in which the feedback loop is through the web itself. An incoming web 10 passes through a group of feed rolls 12, one of which is coupled to drive a tachometer generator 14. The signals from this generator are applied by way of a connection 15 to a computer 16 whose function it is to provide signals for driving a compensator actuating device 18 through a line 20. The web passes over suitable idlers 22 and 24 to a web loop type compensating device 26 which in this instance has a roll 28 mounted for translative movement upon a suitable nut and worm mechanism 30. The compensator actuating device 18 is mechanically coupled to the compensating device 26 by any suitable connection such as a drive belt means 32. Compensation is effected by moving the roll 28 right or left in FIG. 1 to decrease or increase the amount of web included in the thus formed loop.

From the compensating device 26, the web 10 passes over an idier roll 34 and a guide roll 36 to a printing station, represented by a printing cylinder 38 and a backup roll 40, and thence around a guide roll 42 to the next part of the press.

The web 10 is scanned by a scanner 44 whose signals are transmitted to the computer 16 by way of a channel 46. Likewise, a cylinder position monitor 48, coupled to the printing cylinder 38, provides signals of the nature described in said U.S. Pat. 3,120,181 to provide the basic registration control error signals, irrespective of press speed. These signals are transmitted to the computer by way of a channel 50.

Reference herein to lines or channels is not intended to be limited to a single conductor or pair or to a direct electrical connection. In the practical system there are many cables, wires, and connections between the various parts of the system which need not be shown, since this will be understood by those skilled in this art.

Figures 3, 6, 7:
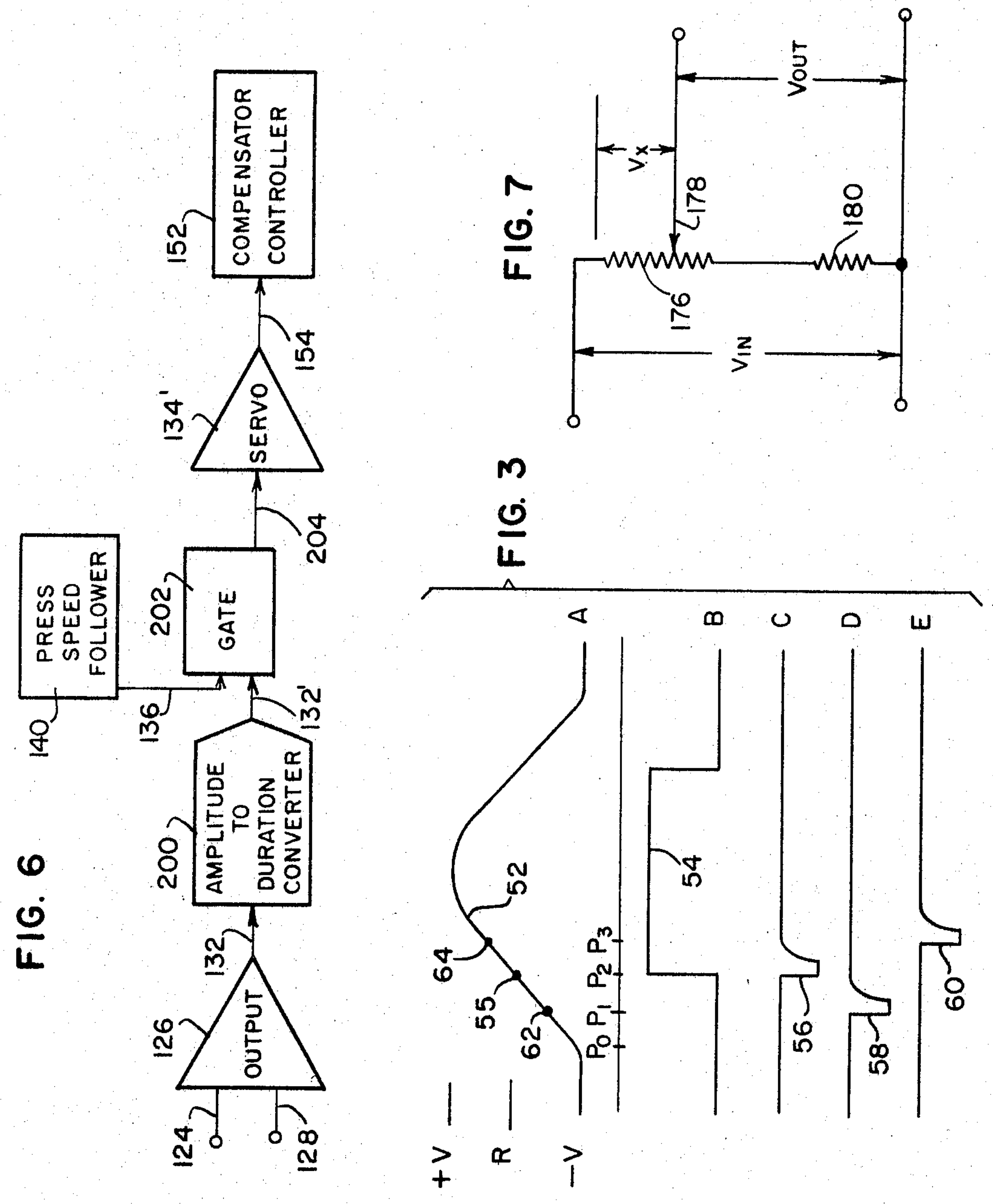
FIG. 3 is a chart of wave shapes all on the same time axis, showing the registration control signals existing for different conditions of register.
FIG. 6 is a partial block diagram of a modified form of the invention.
FIG. 7 is a schematic diagram of the non-linear potentiometer portion of the press speed follower.

For a more complete understanding of the operation of the basic apparatus set forth in Pat. 3,120,181, reference may be had to FIGS. 1 and 3. When a pattern applied to the moving web 10 by a previous printing cylinder and the pattern applied by the cylinder 38 are in exact register, a register mark from the prior pattern elicits a scanner signal in passing the scanner 44 which signal occurs simultaneously with a reference signal produced by the cylinder position monitor 48. Because of an absence of time difference in the formation of these two signals, the computer 16, to which they are applied, produces no response. Quite obviously the speed of the press under these conditions is immaterial, since the product of error and speed is zero. When there is an error, however, there is an error signal resulting from a comparison between the scanner and reference signals. The difference is represented by a voltage whose polarity represents direction, and whose amplitude represents the amount of out-of-register. It will be appreciated that there is a reference signal, a scanner signal and an error signal for each registered pattern, and this formation of a trio of signals is continuously repeated as the pattern bearing web advances, such that the resultant error signal changes as the overlaid patterns are brought back into registration, as will be described.

The cylinder position monitor 48 produces two signals, one of which is a ramp or slope signal which has rise of voltage substantially linear with respect to cylinder position, and the other of which is a square wave reference signal whose leading edge is used to provide the reference point on the slope signal. Thus in FIG. 3 at A, the slope or ramp signal is shown at 52, of which only the rising slope is used. This in effect is a voltage scale, in which any point along the ramp represents a given voltage. For example, the voltage $-V$ at point $P_0$ may be $-20$ volts, and the voltage $+V$ at a later cylinder position point $P_4$ may be $+20$ volts. These values are chosen for convenience, just as the center reference point R of the scale is chosen conveniently to be $+2$ volts D.C. at point $P_2$. The cylinder position monitor 48 also generates a reference signal in the form of a square wave 54, shown at B in FIG. 3. The leading edge occurs at the cylinder position point $P_2$ so that this results in a signal level of R or $+2$ volts, represented by the dot 55 on the ramp signal 52. The scanner 44 produces a signal of the type shown at C, D and E in FIG. 3, representing respectively, an in-register signal 56 whose leading edge occurs at position $P_2$, a leading signal 58 whose leading edge occurs at the position point $P_1$, and a lagging signal 60 whose leading edge occurs at the point $P_3$.

Each of the scanner signals 56, 58 and 60 are represented by the dots 55, 62 and 64 along the ramp signal 52. At dot 55 the reference and scanner signals coincide, representing no error. At dot 62 there is a difference of about 11 volts, representing a leading occurrence of the earlier printing impression. At dot 64 there is a difference of about 9 volts, representing a lagging occurrence of the earlier impression. These differences are detected by the computer 16, in a manner described in said U.S. patent, to produce a resultant error signal having a polarity representing leading or lagging. These errors are amplified for application to the compensator-actuator 18, which in turn drives the compensating device 26.

In FIG. 1, the compensating device 26 is a mechanism which changes the length of a loop of the moving web so that registration correction is applied to the web directly; hence, there is a corrective feedback applied through the web 10. This mode of correction changes the printing cylinder's relative angular position at which the scanner 44 sees the reference mark to produce the signals as described in connection with FIG. 3.

Figure 2:
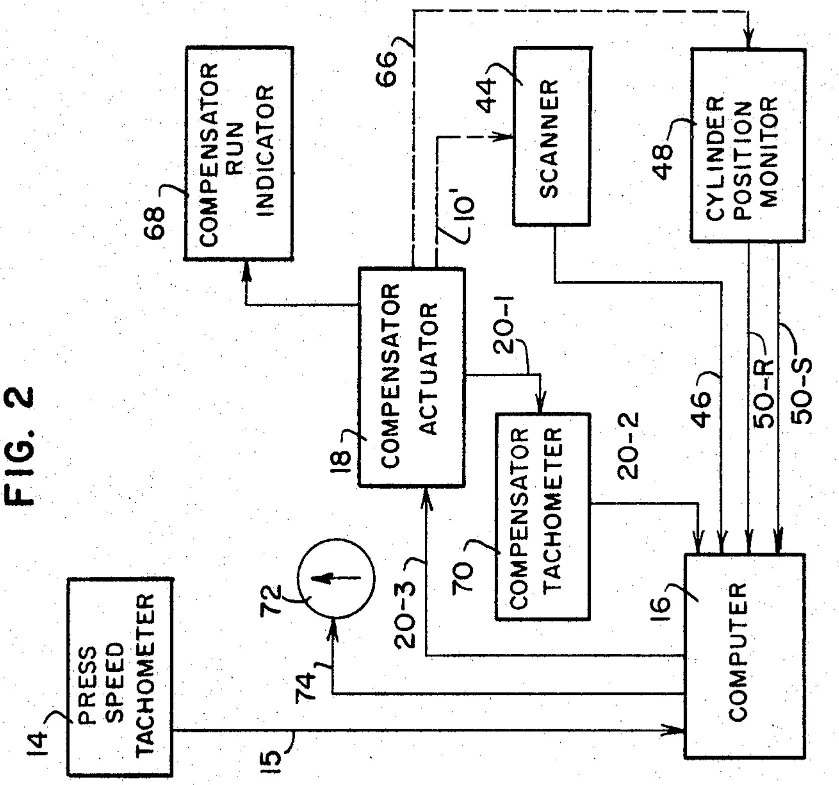
FIG. 2 is a block diagram of a register control of the construction shown in FIG. 1 and illustrating additionally another type of feedback loop.

Referring next to FIG. 2, there is shown in block form, with use of the same reference numerals, the elements described in FIG. 1 with the addition of a few significant variations. The correction feedback through the web is designated by a dashed channel 10′ coupling a compensator-actuator 18 to the scanner 44. The term "compensator-actuator" designates structure having the combined function of receiving the error signals on a line 20–3 from the computer 16 and acting to provide compensation via the channel 10′ or a feedback channel 66 coupled to the cylinder position monitor 48. The latter feedback can operate upon the cylinder 30 to vary its spatial relationship to the remainder of the printing press and thereby provide a second mode of correction termed "cylinder compensation."

Another output from the compensator-actuator is to a compensator run indicator 68 which may contain various forms of visual and audio devices to indicate to the pressman the amount and type of compensation being applied.

Yet another output from the compensator-actuator, via a connection 20–1, is to a compensator tachometer 70 which, by a connection 20–2, is effectively interposed between the compensator-actuator and the computer. Thus, these three elements—16, 18, and 70—and their connections—20–1, 20–2, and 20–3—form an internal control loop through which precise linear control over the feedback channels 10′ and 66 is provided. The primary purpose of the compensator tachometer 70 is to improve the control linearity by insuring that the output speed of the actuator portion of the compensator-actuator 18 is proportional to the input signal applied from the computer on line 20–3.

A more complex and highly advantageous relationship between the tachometers 14 and 70 will be described with reference to FIGS. 4 and 5. Overly simplified, the signals from both the tachometers are multiplied together to form a proportional signal which then is comparatively applied, within the computer, with the error signals from the scanner 44 and the cylinder position monitor 48 to form a product or resultant output signal which drives the compensator-actuator. As a result, the compensator-actuator 18 adjusts to decrease the amount of error, which decrease is sensed by the computer 16 to decrease the speed of correction applied by the compensator-actuator. If, as if frequently the case, the press speed independently is changing during operation, the tachometer 14 applies a signal which causes compensation to be provided at a rate also proportional to the press speed.

An indicating meter 72 is connected by a line 74 to the computer for indicating the amount and direction of the registration error signal developed jointly by the scanner and the cylinder position monitor.

Figure 4:
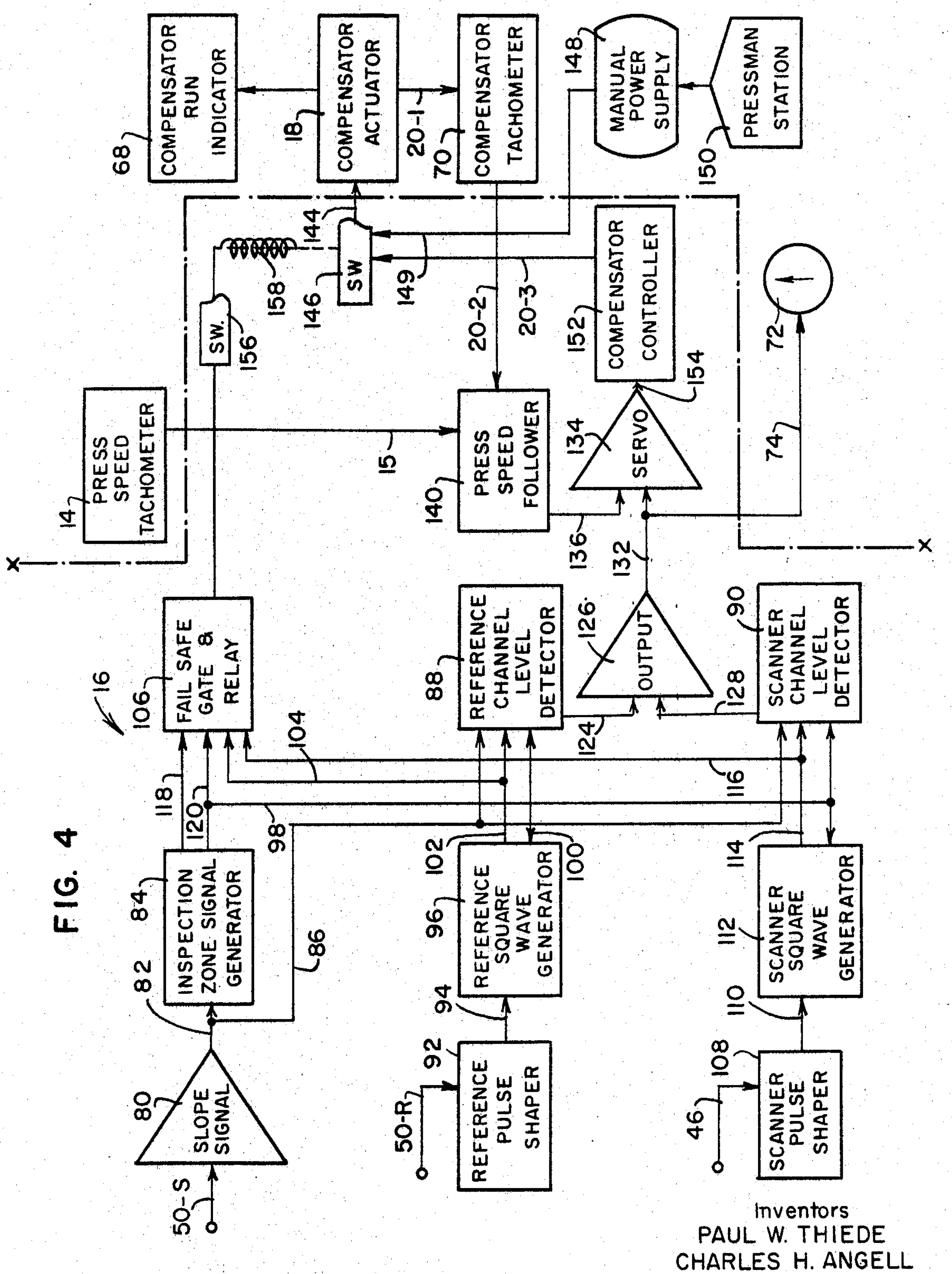
FIG. 4 is a block diagram of the complete invention, emphasizing the computer of the apparatus.

In FIG. 4 there is illustrated a detailed block diagram of the computer 16 and related apparatus, including previously identified components illustrated in FIGS. 1 and 2. The computers sub-components lie to the left of the dashed construction line X—X. The several previously noted channels and connections to and from the computer will assist in orienting the positions of its sub-components. For example, the input signals are applied through connections identified as 50S, 50R, 46, 15, 20–2 and 149; while, the primary output connection is identified as 144, which in fact is an extension of the line 20–3. All of the apparatus involved between these connections may be considered the computer 16.

A substantial portion of the computer 16 relates to the basic registration control described in Pat. 3,120,181. Additional parts relate to manual operation, fail-safe provisions, switching and the like, but the basic invention need not consider these, it being presumed that a practical installation will have them depending upon the requirements of the press or other machine, and safety dictates.

The three input signals appearing at the left of FIG. 4 comprise the scanner pulse at 46, which has a sharp leading edge which corresponds to the register mark seen by the scanner; a slope signal from the cylinder position monitor 48 appearing at 50S; and a reference signal from the cylinder position monitor, appearing at 50R. These signals are generated in a manner described in said Pat. 3,120,181. The slope signal is applied to a slope signal voltage and power amplifier 80. As seen in FIG. 3, the slope signal 52 is pyramidal. Another function conveniently performed by the amplifier 80 is to cause the voltage level to drop abruptly near the base line immediately after the peak is reached. This eliminates an unnecessary extension of the inspection zone and makes the inspection zone, which is the leading half of the slope signal, more nearly symmetrical with respect to the reference signal.

The output from the amplifier 80 is applied by way of a connection 82 to an inspection zone square wave and reset signal generator 84 and by way of a connection 86 to a reference channel level detector 88 and a scanner channel level detector 90. The purpose of these connections is to achieve the desired comparison of levels as mentioned above and explained further below.

The reference signal 50R is applied to a pulse shaper 92, which produces a very stable signal at its output 94. The shaper output is a pulse of a predetermined amplitude and duration having a fast rise time on its leading edge. This pulse remains relatively unchanged by the amplitude, shape or repetition rate of the reference signal received at 50R. The output 94 is applied to a square wave generator 96, which may be a bistable circuit reset to one of its stable states by the arrival of a reset pulse generated in the reset signal generator 84 and transmitted by a line 98 to a connection 100. A reset signal occurs at the beginning of each cylinder revolution and is controlled by the leading edge of the slope so that the generator 96 assumes one characteristic state prior to the receipt of the leading edge of the shaped reference signal. On receipt of the reference signal, its state then changes and remains in this second stable condition until reset again. In changing state, the desired square wave is generated and applied by way of a line 102 to the reference channel level detector 88 for gating the same. This same square wave signal is also applied by way of a line 104 to a fail-safe gate and relay 106.

A scanner pulse shaper 108 receives the scanner signal on the input 46 and provides on an output line 110 a sharp pulse whose characteristics are similar to those of the output of the reference pulse shaper 92. The output on the line 110 is applied to a square wave generator 112, which is quite similar in operation to the square wave generator 96 and provides an output on a line 114 coupled to the scanner channel level detector 90 and to the fail safe gate and relay 106 by way of a line 116.

As already stated, the amplified slope signal on the connection 82 is applied to the inspection zone square wave and reset signal generator 84. This generator provides a rectangular gating pulse having leading and trailing edges which coincide with the leading and trailing edges of the slope signal 52 shown in FIG. 3. This square wave establishes the inspection zone used in the fail-safe circuit 106 and is applied thereto through a connection 118. The same reset signal applied on line 98 and 100 to the generator 96 is also applied by way of a connection 120 to fail-safe gate and relay 106, with its leading edge corresponding to the leading edge of the inspection zone.

The reference channel level detector 88 detects the voltage which has been reached by the slope signal 52 at the instant that the reference signal 54 arrives and stores this voltage level for the remainder of the cylinder revolution. Thus, the voltage level which will be reached and stored according to FIG. 3 is R volts. It will be appreciated that the detector provides an essential function of being relatively insensitive to slow, long term voltage changes caused by component aging and the like. The output of the detector 88 is a D.C. voltage on line 124, which remains at a constant value for the entire cylinder revolution and is applied to an output amplifier 126.

The scanner channel level detector 90 operates exactly as the detector 88, so that its output on line 128 is also a constant D.C. voltage for each cylinder revolution. This level changes from revolution to revolution as the arrival point of the scanner signal changes as described in connection with FIG. 3.

The output amplifier 126 is a differential amplifier and has an output only when there is a difference between the voltage levels of the two signals applied at its inputs 124 and 128. The output of the amplifier 126 appears on a line 132, is a voltage proportional to the error in registration, and can be read as to amount and polarity on the meter 72, as previously noted with reference to FIG. 2.

Up to this point, the computer described is fairly straightforward and differs little from the structure of the said Pat. 3,120,181. In the said patent, the output of the differential amplifier is applied to a hydraulic servo mechanism to drive the compensating mechanism. In the present invention, it is preferred to apply the signal output to a direct current motor sensitive to such signals and to use the motor to drive the compensating mechanism. This motor is designated 18 in FIG. 1 and is part of the compensator-actuator 18 in FIGS. 2, 4 and 5. The output signal from the amplifier 126 could be applied to the unit 18 directly, in which case its motor would rotate in one direction or another at a speed proportional to the voltage on line 132, hence proportional to the registration error. This voltage representative of error would vary as the two patterns are brought back into register and the feedback of the system senses the decrease of error and reduces the applied voltage on the line 132.

According to the present invention and as detailed in FIG. 4, the signal on the line 132 is applied to a servo amplifier 134 along with another signal or voltage appearing on a line 136. The signal on the line 136 represents a voltage which is proportional to the compensator motor speed and inversely proportional to the press speed and is developed in a press speed follower 140. The tachometer 14 is connected to be driven by some suitable shaft of the printing press and is actually a small generator to provide the signal voltage on the connection 15 proportional to press speed, which signal is applied to the press speed follower 140. The compensator tachometer 70 also applies its output to the press speed follower 140, this being by way of the line 20–2.

The compensator-actuator 18 receives its power by way of a connection 144 through a switch 146 either from a manual power supply 148 via a line 149, controlled by a pressman at a station 150, or by way of the connection 20–3 from a compensator controller 152, which is interposed between the servo amplifier 134 and the line 20–3 through a connection 154. The switch 146 changes from an automatic operation condition either by a signal from the fail safe gate and relay circuit 106 or by control of a manual switch 156 operating a relay 158; however, this forms no part of the invention and will not be further discussed.

The direct current motor portion of the compensator-actuator 18 is preferably of the permanent magnet field type, the armature of which receives D.C. voltages from the compensator controller 152. Direction of rotation of the motor is determined by the polarity of signals from the servo amplifier 134 and its speed is proportional to the magnitude of the input signals. The compensator tachometer 70 provides the feedback signal to the press follower. Power to the armature of the compensator-actuator motor is controlled by four silicon controlled rectifiers, respective pairs of which are fired on alternate half cycles of the A.C. supply frequency, to control armature current in one direction and the other, respectively. A magnetic amplifier firing circuit provides the firing pulses for these rectifiers, using techniques of circuitry which are known. These circuit details are not illustrated since they are somewhat common and reference may be had to circuits recommended by various manufacturers of magnetic firing components for controlling silicon controlled rectifiers and thyratron tubes so that the portion of the cycle during which the rectifiers are firing will determine their output, this latter being used to drive apparatus such as motors. One such manufacturer is Firing Circuits, Inc., of Wilton, Conn., and a discussion suitable will be found in their Bulletin 6000.

Reference will now be made to the press speed follower 140, which in effect forms one of the important components of the apparatus. This component, which is detailed in a circuit diagram in FIG. 5, is a composite device which: receives the speed of the press through connection with the press speed tachometer 14, amplifies the difference between voltages applied by the tachometer 14 and reference supplies to provide an electro-mechanical following of the press speed; reacts in an inverse, non-linear manner to this press speed following; multiplies a resultant press speed factor with a feedback output from the compensator tachometer 70; and applies the product as one input to the servo amplifier 134, which also receives the error signal from the output amplifier 126.

Figure 5:
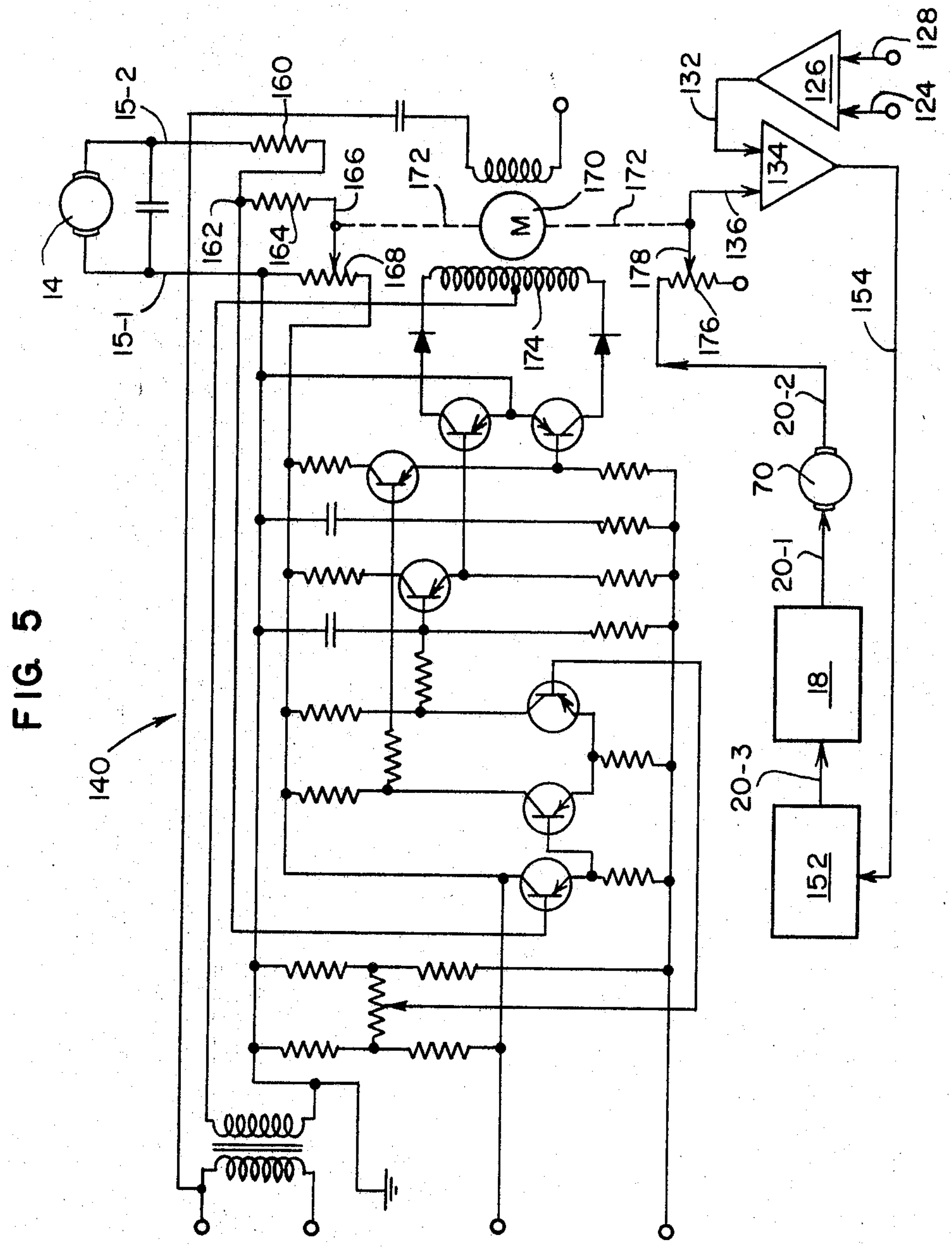
FIG. 5 is a circuit diagram of the press speed follower portion of the apparatus coupled to interrelated elements shown in block form.

As shown in FIG. 5, the press speed tachometer 14 is coupled by connections 15–1 and 15–2 to the press speed follower 140. A resistor 160 joins the connection 15–2 to a summing point 162 of conventional differential amplifier circuitry shown within the press speed follower. Another resistor 164 couples the summing point 162 to the arm 166 of a potentiometer 168. A servo motor 170 is mechanically connected by linkage 172 to the potentiometer arm 166.

The potentiometer 168 is a linear device in that the position of its arm 166 is directly proportional to press speed. Thus, extreme counter clockwise arm position of the arm 166 is at zero press speed; at one-half press speed, the arm is driven one-half turn clockwise, as illustrated; and at full press speed the arm is positioned at its maximum one turn clockwise position. This is accomplished by forcing the arm 166 to move to maintain the summing point 162 at zero potental. Any voltage appearing at point 162 different from zero is amplified by servo amplifier circuitry comprising the illustrated transistors and their associated circuit elements, connected conventionally. Such magnified difference voltage appears across a winding 174 and drives the servo motor 170 in a direction which tends to reduce the voltage difference to zero by moving the arm 166 in the appropriate direction.

A second potentiometer 176, having an arm 178, is also coupled to the servo motor 170 by the linkage 172. Accordingly, its arm position is also proportional to the press speed. However, as will be detailed subsequently, the potentiometer 176 is a non-linear device.

Up to this point, the function of the press speed follower structure has been to provide servo control over the arm 178 to enable its positioning along the potentiometer 176 to be an especially accurate representation of the press speed transduced by the press speed tachometer 14. The potentiometer 176, because of the voltage applied thereacross and the relative position of its arm 178, acts as a voltage multiplier whose output 136 is applied to the servo amplifier 134.

The voltage multiplying operation will be readily understood by an appreciation of the fact that the voltage across the potentiometer, which is applied from the compensator tachometer 70 via the line 20–2, is picked off by the arm 178. Hence, if the voltage applied via line 20–2 quadruples and the arm 178 is independently driven along the potentiometer by the linkage 172 to provide a voltage increment of one-half, the resultant voltage product of two would be placed upon the output 136.

In the commercial embodiment, a reciprocal of the press speed is multiplied by the voltage applied on line 20–2 and the resulting fraction is applied to the servo amplifier 134. As previously described, the other input to the amplifier 134, which is a differential amplifier, represents the error signal from the output amplifier 126. Reducing this to simple mathematics:

(1) $F\times 1/S\ (-E)=0$=the desired output on line 154 therefore;

(2) $F=E\times S$—the desired goal of this invention

Where:

F is the feedback voltage on line 20–2;
$1/S$ is the reciprocal of the press speed S and results from the positioning of the arm 178 by the linkage 172 combined with the special non-linear resistance characteristic of the potentiometer 176; and
E is the error signal applied from the differential output amplifier 126 to the differential servo amplifier 134.

The minus sign in front of E denotes the operation of the differential amplifier 134, which, because of the feedback loop including the elements between the connection 154 and the line 20–2, forces the compensation-actuator's motor shaft speed (F from the tachometer 70) to be proportional to the product of register error (E) and press speed (S)—the desired goal of this invention.

Unfortunately, this method of control of registration compensation is not without practical limitations. In particular, the multiplied output $F/S$ would have to become very large at low press speeds and infinite if the press stopped. This, of course, is impossible. It is possible, however, to maintain the desired relationship over a finite speed range, say, from one quarter or one third full press speed up to full press speed. Below the minimum selected press speed the compensator motor speed could remain proportional to error, but would not change as press speed changes. This invention accomplishes this objective by equipping its servo-multiplier with a special non-linear multiplier potentiometer 176. As already described, the angular position of the wiper arm 178 is made proportional to press speed; therefore, if the resistance of the potentiometer is made non-linear, the desired result is obtainable.

The resistance of the multiplier potentiometer as a function of wiper arm position is determined as follows with reference to FIG. 7 in which:

$R_1$=the total resistance of the multiplier potentiometer 176;
$R_2$=a fixed resistor 180 (not shown in FIG. 5);
A=a selected ratio of maximum press speed to minimum press speed;
$k$=fractional rotation of wiper arm (full clockwise rotation $k=1$, halfway clockwise $k=.5$, etc.), $k$ is also equal to press speed expressed as a fraction of top press speed;
$f(k,\mathrm{A})$=required resistance function as fraction of total resistance of multiplier potentiometer;
$V_x$=the relation $F(k,A)\cdot R_1$
$V_{out}$=the output signal $F/S$ on the line 136 in FIG. 5; and
$V_{in}$=the compensator motor tachometer output, F.

Assuming a fixed error signal (E) input to the servo amplifier 134, a little though will show the following:

(a) For a fixed error signal the feedback voltage $F/S$ ($V_{out}$ of FIG. 7) remains fixed.
(b) Feedback voltage ($V_{out}$)=Compensator motor tachometer output voltage F ($V_{in}$ of FIG. 7) for minimum compensator motor speed.
(c) Compensator motor tachometer output voltage ($V_{in}$) max.$=A\cdot V_{out}$ for maximum compensator motor speed, and this occurs at maximum or full press speed.
(d) Between the limits set in (b) and (c) it is required that compensator motor speed be proportional to press speed, which is represented by $k$, the wiper position.
(e) If compensator motor speed is proportional to $k$, compensator motor tachometer output voltage is also proportional to $k$. Therefore:

(3) $$V_{in}=ckV_{out}$$

where $c$ is some constant. (Remember that $V_{out}$ remains constant, since the error signal (E) is being held constant).

To evaluate $c$, recall that maximum compensator motor speed, or tachometer output voltage, occurs at full press speed when $k=1$.

From paragraph (c) above:

(4) $$(V_{in})\ \text{max.}=A\ V_{out}-ck\ \text{max.}\ V_{out}$$

and therefore $$A=ck\ \text{max.}$$

Since $k$ max.$=1$, $c=A$; hence.

(5) $$V_{in}=kA\ V_{out}$$

As mentioned above, this proportionality is maintained from full press speed down to a selected fraction, $1/A$, of full press speed. Therefore, (6) $$V_{in}=kA\ V_{out}\ \text{for}\ 1\geqq k\geq 1/A\ \text{and}$$

(7) $$V_{in}=V_{out}\ \text{for}\ 1/A\geqq k\geq 0$$

Thus, (8) $$V_{out}=\frac{V_{in}}{R_1+R_2}\{R_2+[1-f(k,A)]R_1\}$$

over the proportionality range of $V_{out}=V_{in}/kA$. Also, since $(V_{in})$ max.$=V_{out}$, then, (9) $$\frac{R_1+R_2}{R_1}=A$$

and

(10) $$R_1=R_2(A-1)$$

By substitution from the above, the following arises:

(11) $$V_{in}/kA=\frac{V_{in}}{R_1+R_2}\{R_2+[1-f(k,A)]R_1\}$$

and $$1/kA=\frac{1}{R_2(A-1)+R_2}\{R_2+[1-f(k,A)][R_2(A-1)]\}$$

$$=\frac{1}{AR_2}[R_2+R_2(A-1)-R_2(A-1)f(k,A)]$$

$$=\frac{1}{AR_2}[AR_2-R_2(A-1(f(k,A)]$$

$$=1-\frac{A-1}{A}f(k,A);$$

$$\frac{A-1}{A}f(k,A)=1-\frac{1}{kA}=\frac{kA-1}{kA}$$

and therefore $$f(k,A)=\frac{kA-1}{k(A-1)}\ \text{for}\ 1\geq k\geq 1/A$$

and $$f(k,A)=0\ \text{for}\ 1/A\geq k\geq 0$$

Thus, with a resistance characteristic as described by the above equations, the compensator motor speed is required to be proportional to the product of press speed and register error over the press speed range from full speed to $1/A$ times full press speed.

As previously stated, another method of using the basic concept of the invention is to provide a correction rate (or speed) which is proportional to the speed of the press, but maintained for a duration proportional to the error in registration or vice versa. This can be accomplished by a simple modification of the apparatus which has been described. In such a circuit, the error voltage may be used to provide a clipping signal whose duration is proportional to the amplitude of the error voltage. For example, a transistor may be biased to operate in a constant current mode, to produce an output for a length of time proportional to the time that it takes for a charge to leak off of a condenser charged by an error voltage. The greater the error voltage, the longer it will take for the condenser to discharge. Other storage circuits could be used. The signal from amplitude to duration converter would be used to gate the output from the press speed follower. Thus, the speed of the compensator motor would always be proportional only to the press speed, but the length of time that it applies its correction will depend upon the amount of error.

FIG. 6 illustrates this structure as an alternate form of the invention. Only the pertinent elements of FIG. 4 which are modified are illustrated. An error signal amplitude to duration converter circuit 200 and a gating circuit 202 are interposed between the output amplifier 126 and the servo amplifier 134 by use of conductors 132′ and 204. Not only is there voltage multiplication in the press speed follower, as previously described but the gate 202 in effect multiplies voltage and time. Obviously the amplifier 134′ will no longer be a differential amplifier, but will be adapted to give the best output voltage for the different press speed amplitudes without concern as to the value of error voltage durations, since this will not be on amplifiable factor. While the preferred embodiment of this inventive aspect shows the press speed follower 140 providing the speed input to gate 202, it will be appreciated that, generically, any press speed monitor, as designated by element 14 in generic FIG. 1, may be employed to provide the speed magnitude signal.

It is believed that the hereinabove disclosed primary and alternate embodiments have been sufficiently explained to enable those skilled in the art to understand the invention and the desirable objectives achieved thereby and also to recognize that although some variations may be mode thereof, such would not depart from the spirit and scope of the invention.

What is desired to be secured by Letters Patent of the United States is:

1. A web register control apparatus for minimizing the registration error between a plurality of patterns applied to a web moving continuously, though at variable speeds, comprising:
web pattern registration monitoring means producing output signals indicative of magnitudes of registration error,
web speed monitoring means producing output levels indicative of magnitudes of web speed,
means coupled to receive said output signals and said output levels for deriving a plurality of successive resultants each of which is proportional to the combination of its associated registration error and web speed,
web registration compensation means coupled to receive said resultants and energized thereby to minimize the registration error, the magnitudes of said resultants effecting corresponding varying degrees of energization and response of said web registration compensation means, and
compensation degree responsive monitoring means including a tachometer connected between said web registration compensation means and said means for deriving said resultant signals and operable to provide output data for forming said resultants.

2. Apparatus as defined in claim 1 in which:
said web registration compensation means comprises a cyclically operative device having a cyclic speed proportional to said degrees of response, and
both said web speed monitoring means and said compensation degree response monitoring means are tachometers, the magnitude of each said resultant developed by said resultant driving means being proportional to the mathematic product of its associated registration error and the web speed for regulating the cyclic speed of said device.

3. Apparatus as defined in claim 2 in which said means for deriving resultants comprises:
speed follower means which receives the outputs from both said tachometers and multiples them together as a first step in the formation of said resultant.

4. Apparatus as defined in claim 3 in which said speed follower means comprises:
multiplying circuitry having a first portion linearly responsive to the output from one of said tachometers and a second, non-linearly reacting portion which is coupled to the output of the other of said tachometers such that the output of said multiplying circuitry is non-linear.

5. Apparatus as defined in claim 4 in which said second portion of said multiplying circuit includes a non-linear potentiometer having a wiper arm which moved linearly in response to web speed.

6. Apparatus as defined in claim 5 in which the resistance characteristic of said non-linear potentiometer is defined by the formula $$f(k, A)=\frac{kA-1}{k(A-1)} \text{ for } 1\geq k\geq 1/A$$

in which
A=a selected ratio of maximum web speed to minimum web speed,
$k$=fractional linear movement of said wiper arm such that with a maximum such movement $k$=1, and
$f(k,A)$=required resistance function as a fraction of total resistance of said potentiometer.

7. Apparatus as defined in claim 3 in which said speed follower means comprises:
a first and a second potentiometer each having a wiper arm,
a differential amplifier having a summing point, one side of which is coupled to be responsive to the output of said web speed tachometer and the other side of which is coupled to the wiper arm of said first potentiometer, and
servo motor means having driving linkage connected to both said wiper arms and electrically coupled to said differential amplifier so as to be rotated in a direction which forces the wiper arm of said first potentiometer to move to minimize the voltage differences applied to said summing point,
the rotation of said servo motor being applied to said wiper arm of said second potentiometer by said linkage proportional to the speed of said web speed tachometer,
said second potentiometer being coupled to receive the output from the registration compensation means tachometer.

8. Apparatus as defined in claim 7 in which:
the coupling of said second potentiometer to said compensation means tachometer and to said web speed tachometer is such that the output of said second potentiometer is proportional to the mathematic product of the web speed and the cyclic speed of the registration compensation means, and in which
said second potentiometer is constructed such that it has a non-linear resistance function over the range that its wiper arm moves in response to web speed from a maximum value down to a predetermined value significantly greater than a minimum web speed value.

9. Apparatus as defined in claim 3 in which said means for deriving resultants further comprises:
differential amplifier means coupled to receive as one input the multiplied outputs from said tachometers and as another input said output signals from said pattern registration monitoring means and for providing therefrom each said resultant.

10. Apparatus as defined in claim 3, wherein said means for deriving resultants comprises:

a gate circuit operable to connect said speed follower means to said web registration compensation means, and means for converting said registration error output signals into signals having widths indicative of registration error for operating said gate circuit for corresponding durations.

11. Apparatus as defined in claim 1 in which said web registration compensation means comprises:

a web loop forming means which responds in rate and direction of loop forming operation to said resultant, and in which said web registration monitoring means comprises:

a fixedly positioned pattern scanning means interposed between said registration compensation means and said resultant deriving means as part of a monitoring means feedback loop, one portion of said part being a mechanical feedback channel and the remainder of said part being electrical, the completion of said monitoring means feedback loop being provided through the application of said resultant from said resultant deriving means to said registration compensation means.

12. Apparatus as defined in claim 1 in which said web registration monitoring means comprises:

a printing cylinder position monitoring means spatially adjustable with respect to said apparatus and interposed between said registration compensation means and said resultant deriving means as a part of a monitoring means feedback loop, a portion of said part is a mechanical feedback channel for altering the spatial relationship of said printing cylinder position monitoring means, and the rest of said part is electrical, said compensating degree response monitoring means is interposed between said registration compensation means and said resultant deriving means and forms a part of a speed responsive feedback loop, and the completion of said feedback loops is provided through the application of said resultant from said resultant deriving means to said registration compensation means.

13. For use in a printing press system which feeds a web at a varying speed and having a compensator actuator for regulating the system such that patterns are applied to the web with a minimum of registration error, such error being measured in magnitude and direction by a monitor coupled to a computer which applies a feedback control signal to said compensator-actuator for regulating the amount of compensation provided thereby, the invention comprising the combination of:

a press speed tachometer, a compensator-actuator tachometer, and a press speed follower having servo means, said tachometers each having an output coupled to said press speed follower and therein caused to interact through said servo means such that said press speed follower delivers to said computer an output level having a parameter which is proportional to the mathematic product of the outputs of both said tachometers.

14. The combination as defined in claim 13 in which said press speed follower comprises:

a combination of linear and non-linear potentiometer means which linearly follows the speed of said press throughout its full speed range, but non-linearly reacts to such speed over a portion of the speed range such that the product of the tachometer outputs is non-linear over such range portion.

15. The combination as defined in claim 13 in which said press speed follower comprises:

non-linearly reactive means responsively coupled to said tachometer outputs such that one tachometer output is multiplied by the reciprocal of the other tachometer output to produce a proportionally non-linear product, and said computer comprises differential amplifier means for operation upon said non-linear product and the output from said error monitor for deriving said feedback control signal.

16. A web register control apparatus for minimizing the registration error between a plurality of patterns applied to a web moving continuously, though at variable speeds, comprising:

web pattern registration monitoring means producing output signals indicative of magnitudes of registration error, web speed monitoring means producing output levels indicative of magnitudes of web speed, web registration compensation means, computer means coupled to receive said output levels and said output signals, operate upon said output levels and said output signals to derive a plurality of successive resultants, and apply each resultant to said registration compensation means to energize same to minimize the registration error, each said resultant being proportional to the combination of its associated registration error and the web speed, said output signals from said pattern registration monitoring means varying in duration proportional to the magnitude of registration error, and coincident gating means included in said computer means and coupled to receive said output signals and the output levels from said web speed monitoring means for formation of each said resultant, said register error compensating means thereby being energized at a rate proportional to said web speed related output levels for a duration proportional to the magnitude of register error.

17. In apparatus for controlling registration error between a plurality of patterns carried on a continuously moving web in order to minimize registration error and having means for detecting registration error, means for generating error signals of amplitudes proportional to registration errors, and means for compensating for registration error in response to the error signals, the improvement therein comprising:

means for generating a web speed signal of an amplitude indiuative of web speed, amplitude to width conversion means connected to said means for generating error signals for converting error signals into gating signals of widths indicative of error magnitude, and gate means connected to said web speed signal generating means, to said conversion means and to said compensating means, said gate means being gated by said gating signals to effect operation of said compensation means for durations in accordance with the width of said gating signals.

References Cited

UNITED STATES PATENTS

| | | | |
|---|---|---|---|
| 2,583,580 | 1/1952 | Ludwig | 101—248 XR |
| 3,031,118 | 4/1962 | Frommer | 226—28 |
| 3,084,621 | 4/1963 | Guastavino | 101—248 XR |
| 3,416,058 | 12/1968 | Hill et al. | 318—326 XR |

EUGENE G. BOTZ, Primary Examiner

E. J. WISE, Assistant Examiner

U.S. Cl. X.R.

226—28; 318—326